UNITED STATES PATENT OFFICE.

LEONARD S. van WESTRUM, OF BRANTFORD, ONTARIO, CANADA.

PROCESS OF MAKING A VISCOUS LIQUID MATERIAL.

1,016,801.    Specification of Letters Patent.    Patented Feb. 6, 1912.

No Drawing.    Application filed May 18, 1909.    Serial No. 496,841.

*To all whom it may concern:*

Be it known that I, LEONARD S. VAN WESTRUM, a subject of the Queen of the Netherlands, residing at Brantford, Ontario, Canada, have invented certain new and useful Improvements in Processes of Making Viscous Liquid Material; and I do hereby declare the following to be a full, clear, and exact description of the invention, such as will enable others skilled in the art to which it appertains to make and use the same.

My invention relates to improvements in the methods of manufacturing a rubberlike cement for roofing, paving, painting, and insulating purposes, and which also serves as a substitute for cheap rubber.

Heretofore asphalt, tar, mineral oils, and the residuums therefrom have been mixed with the residuum from petroleum, in order to make an asphalt or tar cement of the right consistency, but the cement so obtained is deficient in elasticity.

The object of my invention is to produce such a cement which will not only have the valuable properties of the cement already described, but will be in addition exceedingly tough and elastic.

My invention therefore consists in the production of such a cement by the addition to asphalt, tar, or mineral oils of a residuum of vegetable oils obtained after distillation, like cotton seed oil pitch, for example.

Cotton seed oil pitch at the present time is not a commercial article but is merely a by-product obtained in soap making. In making white soap, the cotton seed oil is distilled, leaving behind all the colored parts and thick, gummy constituents, the result being a vegetable pitch.

In carrying out my invention, I melt asphalt, tar, or mineral oils and to the melted mass I add from 10 to 40 per cent. of a residuum of mineral oils, such as petroleum residuum, and then to the mixture I add from 1 to 20 per cent. of a residuum of vegetable oils, like cotton seed oil pitch.

In case of liquid asphalt, tar, etc., the residuum of mineral oils may be omitted and merely the residuum of vegetable oils added thereto. For painting purposes, light mineral oils may be used, but for roofing and paving purposes heavy mineral oils are used.

The different mixtures can be varied widely, a specific instance being the following: melted asphalt 70 per cent., petroleum oil residuum 20 per cent., cotton seed oil pitch 10 per cent., all mixed and stirred together, under the influence of heat.

The resulting mixture makes an exceedingly tough and elastic cement, capable of general use for roofing, paving, and insulating purposes. If it is desired to make a paint, the asphalt in the composition mentioned above can be replaced by a light mineral oil.

In case of a paint, I have found it sometimes desirable to use some drying agent, such as linseed oil or the other well known drying oils, or resin, shellac, or zinc oxid, gums, alcohol, turpentine, etc., all of which are well known. Only a small percentage of such a drying agent is required, however.

The product is a viscous liquid which can be readily applied with a brush, and which soon hardens, making a tough coating. It may be used generally for roofing, paving and insulating purposes.

Having thus described my invention, I claim:

The herein described composition of matter consisting of substantially 70 parts asphalt, 20 parts petroleum residuum, and 10 parts cotton seed oil pitch adapted, when spread over surfaces and allowed to dry, to form a tough coating, substantially as described.

In testimony whereof, I affix my signature, in presence of two witnesses.

LEONARD S. van WESTRUM.

Witnesses:
R. M. PARKER,
H. T. McKEEVER.